US012560985B2

(12) United States Patent
Kong et al.

(10) Patent No.: US 12,560,985 B2
(45) Date of Patent: Feb. 24, 2026

(54) SOLID STATE DRIVE TO AVOID ELECTROMAGNETIC INTERFERENCE BY CHANGING THE LENGTH OF BOTTOM PLANE

(71) Applicant: SK hynix Inc., Gyeonggi-do (KR)

(72) Inventors: Sun Kyu Kong, Gyeonggi-do (KR);
Seung Yeob Song, Gyeonggi-do (KR);
Sun Gyu Rhee, Gyeonggi-do (KR);
Jung Cheol Yim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 752 days.

(21) Appl. No.: 17/829,800

(22) Filed: Jun. 1, 2022

(65) Prior Publication Data

US 2023/0232551 A1    Jul. 20, 2023

(30) Foreign Application Priority Data

Jan. 20, 2022    (KR) ........................ 10-2022-0008613

(51) Int. Cl.
*G06F 1/18*    (2006.01)
*G06F 1/187*    (2026.01)

(52) U.S. Cl.
CPC .................................... *G06F 1/187* (2013.01)

(58) Field of Classification Search
CPC ........................................................ G06F 1/187
See application file for complete search history.

(56) References Cited

U.S. PATENT DOCUMENTS

| | | | | |
|---|---|---|---|---|
| 5,262,737 | A * | 11/1993 | Siverling | H01P 1/20 |
| | | | | 333/248 |
| 6,037,541 | A * | 3/2000 | Bartley | H01P 11/007 |
| | | | | 174/382 |
| 6,252,161 | B1 * | 6/2001 | Hailey | H05K 9/0041 |
| | | | | 174/383 |
| 6,555,743 | B1 * | 4/2003 | Worley | G06F 1/187 |
| 9,999,154 | B2 * | 6/2018 | Frank | H05K 5/0208 |
| 10,359,815 | B1 * | 7/2019 | Lin | H01R 12/721 |
| 10,701,796 | B2 | 6/2020 | Chuah et al. | |
| 11,160,162 | B1 * | 10/2021 | Xing | H05K 1/115 |
| 12,184,001 | B2 * | 12/2024 | Perry | H01R 12/7082 |
| 2017/0033441 | A1 * | 2/2017 | Son | H01Q 5/328 |
| 2017/0033812 | A1 * | 2/2017 | Son | H01Q 5/328 |
| 2019/0027192 | A1 * | 1/2019 | Tanzer | G11B 33/1493 |
| 2020/0196495 | A1 * | 6/2020 | Kang | H05K 1/0216 |
| 2021/0132667 | A1 * | 5/2021 | Wong | G06F 1/183 |
| 2021/0298167 | A1 * | 9/2021 | Nozawa | H05K 9/006 |
| 2021/0307215 | A1 * | 9/2021 | Oh | H01R 4/58 |
| 2023/0327354 | A1 * | 10/2023 | Tsuchida | H05K 9/0022 |
| 2024/0194614 | A1 * | 6/2024 | Kim | G06F 1/182 |
| 2024/0288915 | A1 * | 8/2024 | Grady | G06F 1/187 |

(Continued)

*Primary Examiner* — Allen L Parker
*Assistant Examiner* — Douglas R Burtner
(74) *Attorney, Agent, or Firm* — IP&T GROUP LLP

(57) ABSTRACT

The embodiments of the present disclosure relate to a solid state drive. According to embodiments of the present disclosure, the solid state drive may include a notch fastening part in which a notch connecting the solid state drive and a platform outside the solid state drive is fastened, a coupling part coupled to the socket of the platform, and a bottom plane that is a printed circuit board (PCB) plane that forms a cavity between the top plane of the platform when the coupling part is coupled to the socket of the platform.

14 Claims, 9 Drawing Sheets

(56) References Cited

U.S. PATENT DOCUMENTS

| | | | | |
|---|---|---|---|---|
| 2024/0393180 A1* | 11/2024 | Yamada | ............. | G01B 9/02044 |
| 2025/0247947 A1* | 7/2025 | Nozawa | ................. | H01R 12/83 |
| 2025/0298446 A1* | 9/2025 | Tsuchida | ............... | G06F 1/1658 |

* cited by examiner

<u>with notch</u>
<u>(short/short)</u> notch

- - - - F = 1440 MHz
———— F = 2880 MHz
········· F = 4320 MHz

<u>without notch</u>
<u>(short/open)</u> open

- - - - F = 720 MHz
———— F = 2160 MHz
········· F = 3600 MHz

*FIG.7*

$$f_{mn} = \frac{1}{2\pi\sqrt{\varepsilon\mu}} \sqrt{\left(\frac{m\pi}{width}\right)^2 + \left(\frac{n\pi}{length}\right)^2}$$

RF_BAND      NOISE_BAND freq.

$f_{mn}$

SOLID STATE DRIVE TO AVOID ELECTROMAGNETIC INTERFERENCE BY CHANGING THE LENGTH OF BOTTOM PLANE

CROSS-REFERENCES TO RELATED APPLICATION

The present application claims priority under 35 U.S.C. 119(a) to Korean patent application number 10-2022-0008613 filed on Jan. 20, 2022, which is incorporated herein by reference in its entirety.

TECHNICAL FIELD

The embodiments of the present disclosure relate to a solid state drive to avoid electromagnetic interference by changing the length of a bottom plane.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

Solid state drive can be mounted on various types of platforms, such as a desktop, laptop, and smart pad, etc. In this case, a cavity may exist between the solid state drive and the platform.

SUMMARY

Embodiments of the present disclosure may provide a solid state drive, capable of preventing malfunction of the solid state drive by avoiding electromagnetic interference (EMI) caused by the cavity between the solid state drive and the platform.

In one aspect, an embodiment of the present disclosure may provide a solid state drive comprising: a notch fastening part in which a notch connecting the solid state drive and a platform outside the solid state drive is fastened, a coupling part coupled to the socket of the platform, and a bottom plane that is a PCB plane that forms a cavity between the top plane of the platform when the coupling part is coupled to the socket of the platform.

In this case, at least one of a length in a longitudinal direction of a left part of the bottom plane positioned to the left of the notch fastening part and a length in the longitudinal direction of a right part of the bottom plane positioned to the right of the notch fastening part may be less than a preset reference length in the longitudinal direction.

In another aspect, an embodiment of the present disclosure may provide a storage device comprising: a fastening part to which a fastening device connecting the storage device and a platform outside the storage device is fastened, a connection part electrically connected to the platform, and a plane forming a cavity between the platform when the connection part is electrically connected to the platform.

In this case, at least one of a length in a longitudinal direction of the left part of the plane positioned to a left of the fastening part and a length in the longitudinal direction of a right part of the plane positioned to the right of the fastening part may be less than a preset reference length in the longitudinal direction.

According to embodiments of the present disclosure, it is possible to prevent malfunction of the solid state drive by avoiding electromagnetic interference (EMI) caused by the cavity between the solid state drive and the platform.

BRIEF DESCRIPTION OF THE DRAWINGS

FIG. 7 illustrates an example of a resonance frequency band and a noise frequency band according to embodiments of the present disclosure.

DETAIL DESCRIPTION

Figure 1:
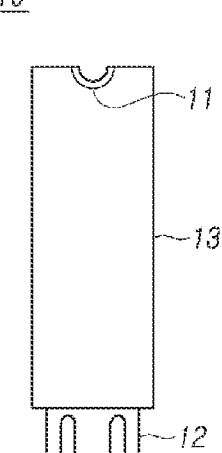
FIG. 1 illustrates a schematic structure of a solid state drive according to embodiments of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in, at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a schematic structure of a solid state drive according to embodiments of the present disclosure.

Referring to FIG. 1, the solid state drive 10 may include a notch fastening part 11, a coupling part 12 and a bottom plane 13.

The notch fastening part 11 is a part in which a notch (not shown) connected to the solid state drive and a platform (not shown) located outside the solid state drive is fastened.

The coupling part 12 is a part coupled to the aforementioned platform (not shown). When the coupling part 12 is coupled to the platform (not shown), it may electrically connect to the platform (not shown) and execute data communication with the platform (not shown).

The bottom plane 13 is a plane that forms a cavity between the top plane of the platform (not shown) and the bottom plane 13 when the coupling part 12 is coupled to the socket of the platform (not shown).

In this case, the bottom plane 13 may be a ground plane to prevent noise caused by signal routing inside the printed circuit board (PCB) included in the solid state drive 10.

Figure 2:
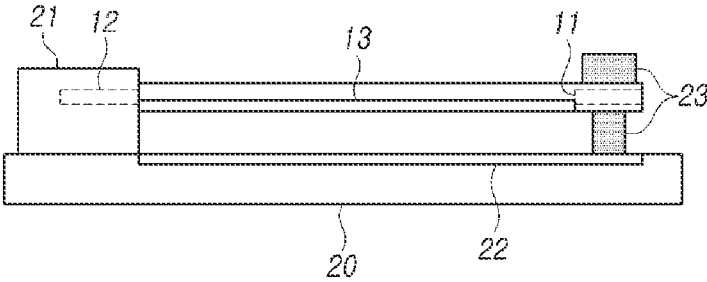
FIG. 2 illustrates a state in which the solid state drive of FIG. 1 is connected to a platform.

FIG. 2 illustrates a state in which the solid state drive 10 of FIG. 1 is connected to a platform.

Referring to FIG. 2, the coupling part 12 of the solid state drive 10 is coupled to the socket 21 of the platform 20. In this case, the coupling part 12 may be physically inserted into the socket 21. As described above, when the coupling part 12 is coupled to the socket 21, the coupling part 12 may electrically connect with the platform 20 and execute data communication with the platform 20.

The notch 23 may be fastened between the notch fastening part 11 of the solid state drive 10 and the platform 20.

In an embodiment, the bottom plane 13 of the solid state drive 10 and the top plane 22 of the platform 20 may face each other.

Figure 3:
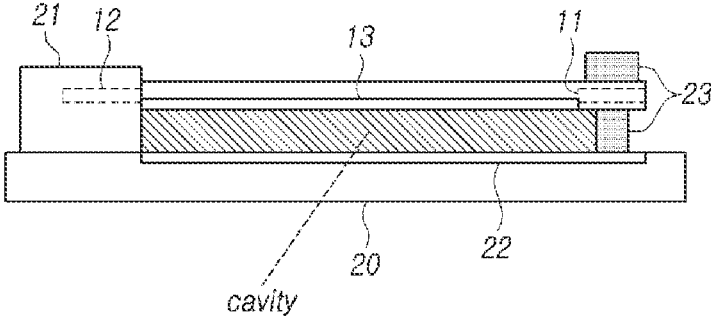
FIG. 3 illustrates a cavity formed when the solid state drive of FIG. 1 is connected to a platform.

FIG. 3 illustrates a cavity formed when the solid state drive 10 of FIG. 1 is connected to a platform.

Referring to FIG. 3, a cavity is created between the bottom plane 13 of the solid state drive 10 and the top plane 22 of the platform 20 facing each other.

When the cavity is created in this way, a resonance frequency that generates resonance in the cavity may exist. If a radio wave having a resonance frequency is generated in the cavity, resonance for the radio wave may occur and the radio wave may be amplified, FIG. 4 illustrates an example of resonance frequency for the cavity of FIG. 3.

Figure 4:
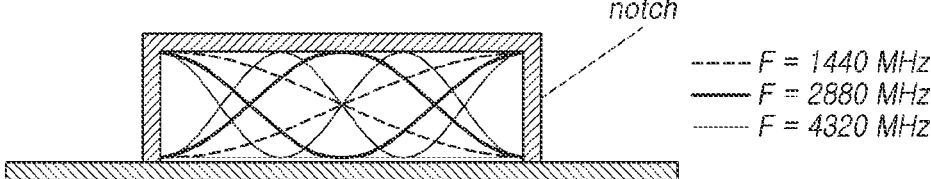
FIG. 4 illustrates an example of resonance frequency for the cavity of FIG. 3.
Figure 4:
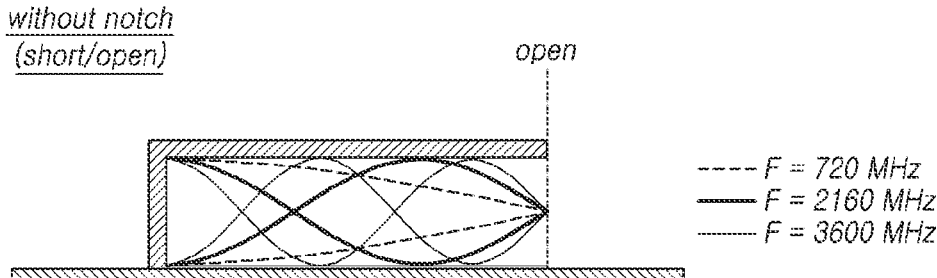

Referring to FIG. 4, both ends of the portion located between the socket 21 of the platform and the notch 23 in the cavity created between the bottom plane 13 of the solid state drive 10 and the top plane 22 of the platform 20 are shorted. In this case, resonance may occur at a frequency having a multiple of a first frequency (e.g., 1440 MHz) in the portion.

On the other hand, the portion that is not located between the socket 21 of the platform and the notch 23 in the cavity generated between the bottom plane 13 of the solid state drive 10 and the top plane 22 of the platform 20 is shorted in the direction of the socket 21 and opened in the opposite direction of the socket 21, In this case, resonance may occur at a frequency having an odd multiple of a second frequency (e.g., 720 MHz). Moreover, the second frequency may be ½ of the first frequency.

As such, resonance may occur in a specific frequency band due to the aforementioned cavity.

When the frequency band in which resonance occurs in the cavity overlaps with the frequency of noise, strong noise may be instantaneously radiated along the solid state drive 10. Noise radiated along the solid state drive 10 may generate electromagnetic interference (EMI).

In particular, electromagnetic interference (EMI) due to resonance may occur when i) a frequency of a plurality of devices coupled to the platform 20 or located inside the platform 20, and ii) a frequency generated by a radio frequency (RF) antenna used for communication with the platform 20 and the outside of the platform 20 overlaps with the resonance frequency band in the cavity. Due to this, the reception sensitivity of the RF antenna may be degraded, or a plurality of devices coupled to the solid state drive 10, the platform 20 or located inside the platform 20 may malfunction.

Therefore, in order to avoid electromagnetic interference (EMI), it is necessary to design the bottom plane 13 of the solid state drive 10 so that the frequency band in which resonance occurs in the cavity and the frequency of noise do not overlap.

Figure 5:
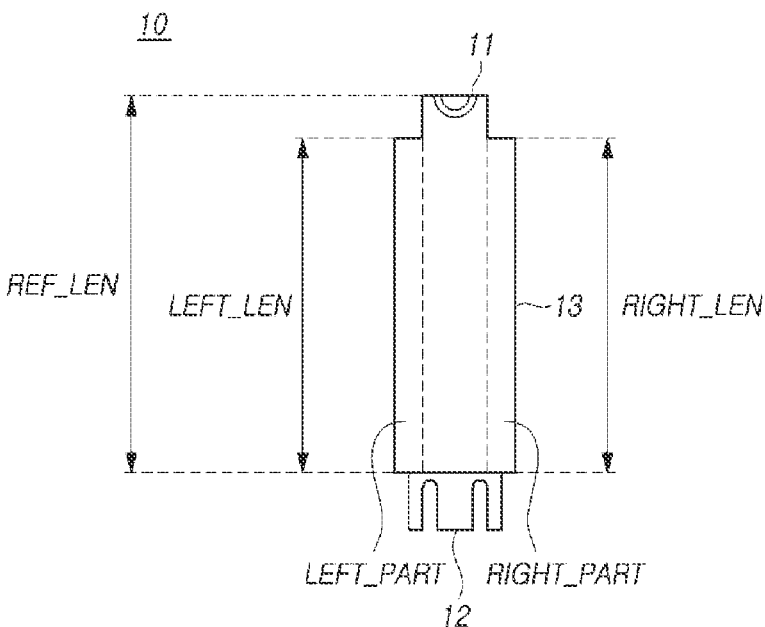
FIG. 5 illustrates an example of the longitudinal length of the left part and right part of the bottom plane of the solid state drive according to embodiments of the present disclosure.

FIG. 5 illustrates an example of the longitudinal length of the left part and right part of the bottom plane of the solid state drive according to embodiments of the present disclosure.

Referring to FIG. 5, at the bottom plane 13, at least one of the longitudinal length (i.e. length in a longitudinal direction) of the left part LEFT_PART positioned to the left of the notch fastening part 11 and the longitudinal length of the right part RIGHT_PART positioned to the right of the notch fastening part 11 may be less than a preset reference longitudinal length (i.e. reference length in the longitudinal direction) REF_LEN.

For example, the longitudinal direction may be determined as a direction from the notch fastening part 11 to the coupling part 12.

For example, the reference longitudinal length REF_LEN may be defined as a distance between the notch fastening part 11 and the coupling part 12. The reference longitudinal length REF_LEN may be, for example, 42 mm or 80 mm.

Figure 6:
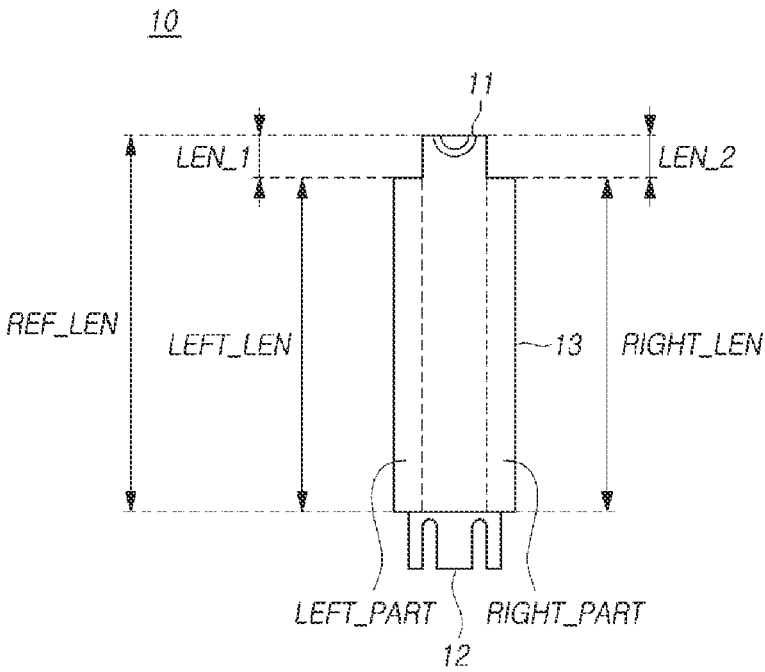
FIG. 6 illustrates an example of a state in which the left edge and the right edge of the bottom plane of the solid state drive are cut according to embodiments of the present disclosure.

FIG. 6 illustrates an example of a state in which the left edge and the right edge of the bottom plane of the solid state drive are cut according to embodiments of the present disclosure.

Referring to FIG. 6, an edge of the bottom plane 13 adjacent to the notch fastening part 11 in the left part LEFT_PART may be cut by a first length LEN_1 in the longitudinal direction. An edge of the bottom plane 13 adjacent to the notch fastening part 11 in the right part RIGHT_PART nay cut by a second length LEN_2 in the longitudinal direction.

By cutting the edge of the left part LEFT_PART of the bottom plane 13 by the first length LEN_1 in the longitudinal direction, the longitudinal length of the left part LEFT_PART of the bottom plane 13 positioned to the left of the notch fastening part 11 may be determined to be less than the reference longitudinal length REF_LEN.

The structure of the bottom plane 13 of the solid state drive 10 may be changed in various ways in order to change the longitudinal length LEFT_LEN of the left part LEFT_PART or the longitudinal length RIGHT_LEN of the right part RIGHT_PART of the bottom plane 13 of the solid state drive 10.

For example, a hole or a slot may be formed in the center of the bottom plane 13. However, since the bottom plane 13 of the solid state drive 10 forms a return path of a signal for signal routing, it is impossible to apply a large deformation to the center of the bottom plane 13.

Therefore, in the embodiments of the present disclosure, a deformation may be applied to the edge of the left part LEFT_PART or the edge of the right part RIGHT_PART of the bottom plane 13, which is a portion adjacent to the notch fastening part 11 in the bottom plane 13.

Also, by cutting the edge of the right part RIGHT_PART of the bottom plane 13 by the second length LEN_2 in the longitudinal direction, the longitudinal length of the right part RIGHT_PART of the bottom plane 13 positioned to the right of the notch fastening part 11 may be determined to be less than the reference longitudinal length REF_LEN.

Moreover, in FIG. 6, a case where the first length LEN_1 and the second length LEN_2 are the same has been described as an example, but the first length LEN_1 and the second length LEN_2 may be different from each other.

For example, the first length LEN_1 may be longer than the second length LEN_2. If there is a high possibility that resonance with respect to the noise frequency will occur in the cavity formed between the left part LEFT_PART of the bottom plane 13 and the top plane 22 of the platform 20, the left part LEFT_PART of the bottom plane 13 may be cut deeper than the right part RIGHT_PART of the bottom plane in order to avoid resonance with respect to the noise frequency.

Figure 7:
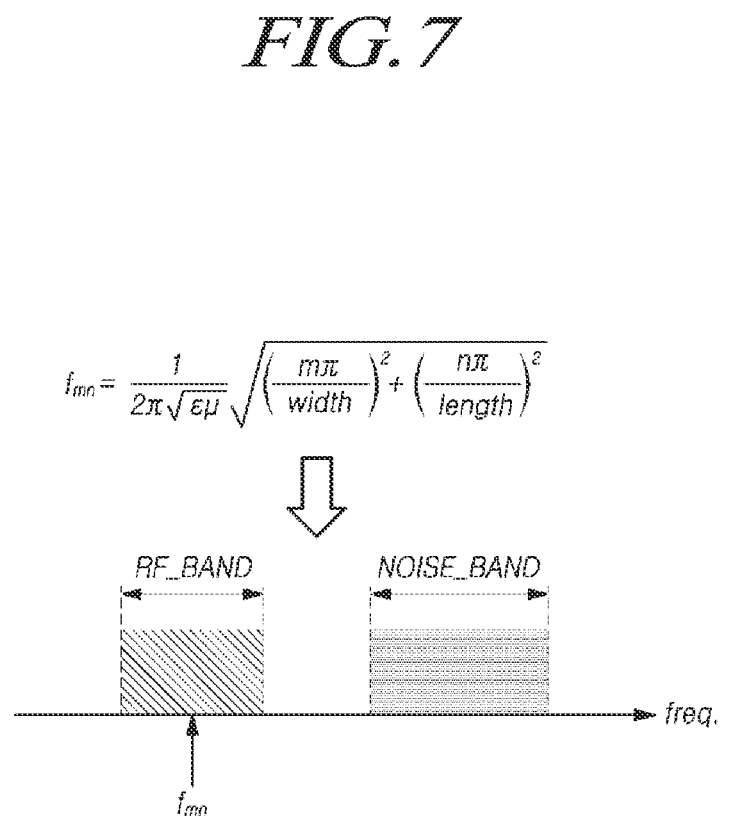

FIG. 7 illustrates an example of a resonance frequency band and a noise frequency band according to embodiments of the present disclosure.

Referring to FIG. 7, the resonance frequency $f_{mn}$ of the cavity between the bottom plane 13 of the solid state drive 10 and the top plane 22 of the platform 20 may be determined as follows.

$$f_{mn} = \frac{1}{2\pi\sqrt{\varepsilon\mu}}\sqrt{\left(\frac{m\pi}{\text{width}}\right)^2 + \left(\frac{n\pi}{\text{length}}\right)^2}$$

In this case, $\varepsilon$ is a dielectric constant of the cavity, u is the magnetic permeability of the cavity, width is the transverse width of the cavity, length is the longitudinal length of the cavity, and in and n are arbitrary integers.

When the longitudinal length of the left part LEFT_PART of the bottom plane 13 positioned to the left of the notch fastening part 11 and the longitudinal length of the right part RIGHT_PART of the bottom plane 13 positioned to the right of the notch fastening part 11 is changed, the length of the cavity formed between the bottom plane 13 of the solid state drive 10 and the top plane 22 of the platform 20 is also changed as a result. Therefore, the resonance frequency of the cavity is changed.

For example, the resonance frequency $f_{mn}$, is 1875 MHz when the transverse width of the cavity is 20 mm and the longitudinal length of the cavity is 80 mm. In this case, when the longitudinal length of the cavity is changed from 80 mm to 70 mm, the resonance frequency $f_{mn}$ may be changed from 1875 MHz to 1900 MHz. However, the specific degree to which the resonance frequency $f_{mn}$ is changed by a change in the longitudinal length of the cavity may vary depending on other parameters.

In FIG. 7, the longitudinal length of the left part LEFT_PART positioned to the left of the notch fastening part 11 and the longitudinal length of the right part RIGHT_PART positioned to the right of the notch fastening part 11 may be determined so that the resonance frequency $f_{mn}$ of the cavity is in a preset target resonance frequency band RF_BAND, The target resonance frequency band RF_BAND may be, for example, LTE20 band (791 MHz~821 MHz) or Wi-Fi band (2412 MHz~2484 MHz).

In this case, the target resonance frequency band RF_BAND may be set to a value that does not overlap with a preset noise frequency band NOISE_BAND.

The noise frequency band NOISE_BAND may include 1) an operating frequency of a plurality of devices coupled to the platform 20 or located inside the platform 20, and 2) a frequency generated by an RF antenna used for communication with the platform 20 and the outside of the platform 20.

In order to prevent electromagnetic interference by the cavity formed between the bottom plane 13 of the solid state drive 10 and the top plane 22 of the platform 20, the transverse width or the bottom plane 13 perpendicular to the longitudinal direction as well as the longitudinal length of the bottom plane 13 may be changed.

Figure 8:
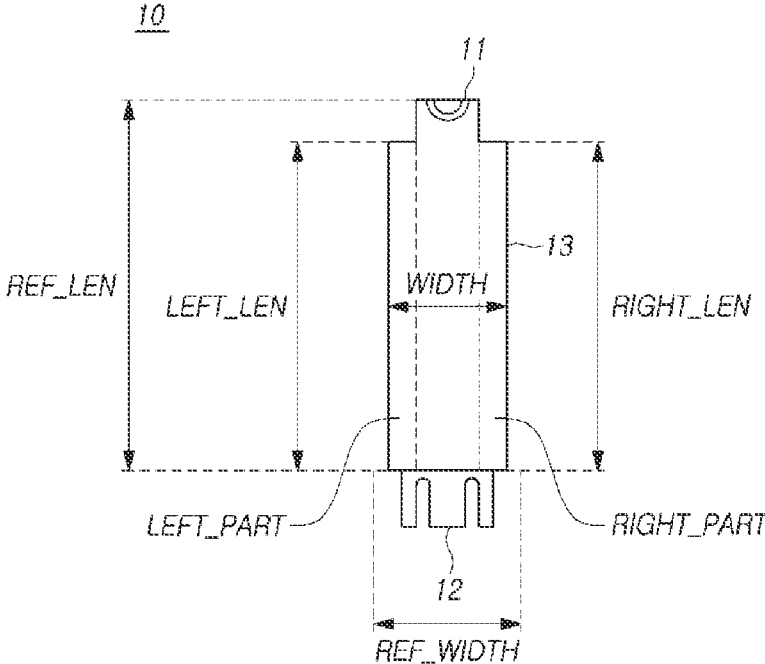
FIG. 8 illustrates an example of the width of the bottom plane of the solid state drive in the transverse direction according to embodiments of the present disclosure.

FIG. 8 illustrates an example of the width of the bottom plane of the solid state drive in the transverse direction according to embodiments of the present disclosure.

Referring to FIG. 8, the width WIDTH of the bottom plane 13 in the transverse direction may be less than a preset reference transverse width REF_WIDTH.

The transverse direction is perpendicular to the longitudinal direction.

For example, the reference transverse width REF_WIDTH may be 22 mm.

Furthermore, although the solid state drive 10 has been described as an example in FIGS. 1 to 8, the above description may be applied not only to the solid state drive but also to a general storage device.

For example, a storage device may include 1) a fastening part to which a fastening device (e.g., notch) connecting the storage device and a platform outside the storage device is fastened, 2) a connection part electrically connected to the platform, and 3) a plane forming a cavity between the platform and the plane when the connection part is electrically connected to the platform. In this case, at least one of the longitudinal length of the left part of the plane positioned to the left of the fastening part and the longitudinal length of the right part of the plane positioned to the right of the fastening part may be less than a preset reference longitudinal length.

The longitudinal direction may be a direction from the fastening part to the connection part.

In this case, an edge of the plane adjacent to the fastening part in the left part may be cut by a first length in the longitudinal direction, and an edge of the bottom plane adjacent to the fastening part in the right part may be cut by a second length in the longitudinal direction.

The longitudinal length of the left part and the longitudinal length of the right part may be determined so that the resonance frequency of the cavity formed between the plane and the top plane of the platform is in a preset target resonance frequency band.

In this case, the target resonance frequency band may be set to a value that does not overlap with a preset noise frequency band for noise generated in the platform. For example, the noise may be generated by a RF antenna connected to the platform.

Moreover, the width of the plane in the transverse direction perpendicular to the longitudinal direction may be less than a preset reference transverse width.

Figure 9:
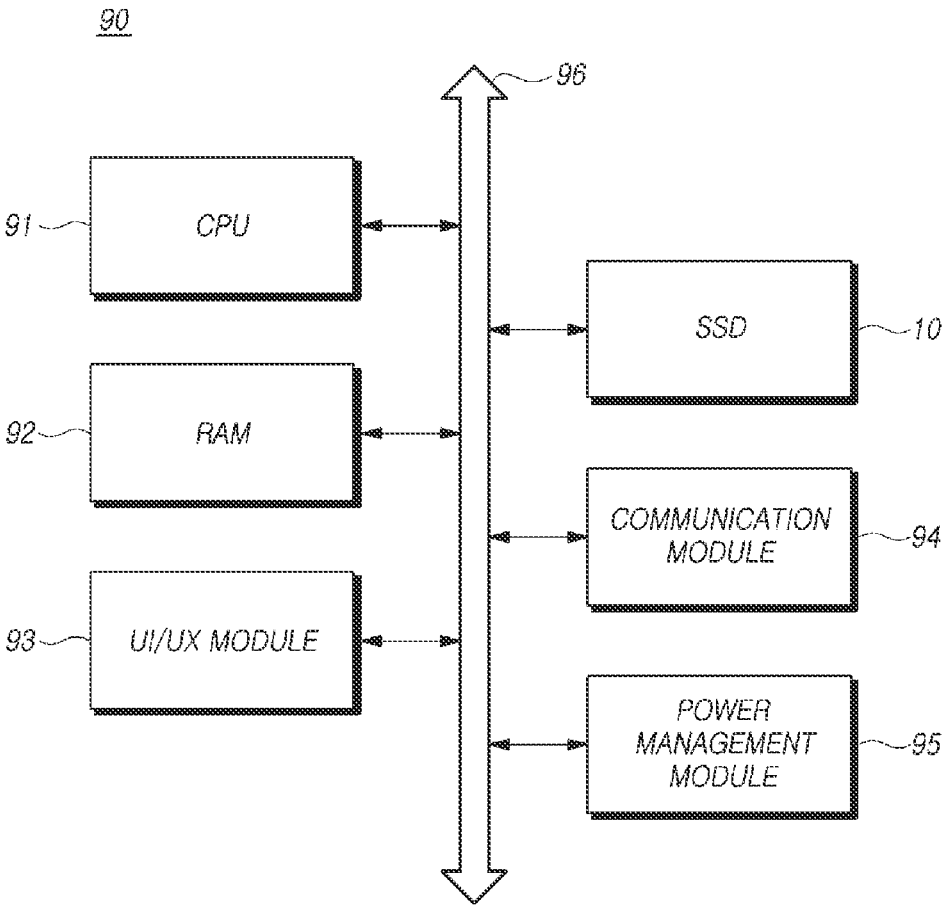
FIG. 9 illustrates the configuration of a computing system according to embodiments of the present disclosure.

FIG. 9 is a diagram illustrating the configuration of a computing system 90 based on an embodiment of the disclosed technology.

Referring to FIG. 9, the computing system 90 based on an embodiment of the disclosed technology may include: a solid state drive (SSD) 10 electrically connected to a system bus 96; a CPU 91 configured to control the overall operation of the computing system 90; a RAM 92 configured to store data and information related to operations of the computing system 90; a user interface/user experience (UI/UX) module 93 configured to provide the user with a user environment; a communication module 94 configured to communicate with an external device as a wired and/or wireless type; and a power management module 95 configured to manage power used by the computing system 90.

The computing system 90 may be a personal computer (PC) or may include a mobile terminal such as a smartphone, a tablet or various electronic devices.

The computing system 90 may further include a battery for supplying an operating voltage, and may further include an application chipset, a graphic-related module, a camera image processor, and a DRAM, Other elements which may further be included would be apparent to a person skilled in the art.

The solid state drive 10 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the solid state drive may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized, Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments,

What is claimed is:

1. A solid state drive (SSD) comprising:
a notch fastening part in which a notch connecting the solid state drive and a platform outside the solid state drive is fastened;
a plurality of devices coupled to the solid state drive;
a coupling part coupled to a socket of the platform; and
a bottom plane that is a printed circuit board (PCB) plane that forms a cavity between a top plane of the platform and the bottom plane when the coupling part is coupled to the socket of the platform, wherein at least one of a length in a longitudinal direction of a left part of the bottom plane positioned to a left of the notch fastening part and a length in the longitudinal direction of a right part of the bottom plane positioned to a right of the notch fastening part is less than a preset reference length in the longitudinal direction,
wherein a resonance frequency, which is determined by the length in the longitudinal direction of the left part and the length in the longitudinal direction of the right part, of the cavity formed between the bottom plane and the top plane of the platform is in a preset target resonance frequency band,
wherein the preset target resonance frequency band in which resonance occurs in the cavity and a preset noise frequency band generated by noise in the platform do not overlap, and
wherein electromagnetic interference from the noise in the platform radiated along the solid state drive is avoided in the plurality of devices coupled to the solid state drive.

2. The solid state drive of claim 1, wherein the longitudinal direction is a direction from the notch fastening part to the coupling part.

3. The solid state drive of claim 1, wherein the reference length in the longitudinal direction is 42 mm or 80 mm.

4. The solid state drive of claim 1,
wherein the length in the longitudinal direction of the left part of the bottom plane is less than the reference length in the longitudinal direction by an edge of the bottom plane adjacent to the notch fastening part in the left part due to being cut by a first length in the longitudinal direction, and
wherein the length in the longitudinal direction of a right part of the bottom plane less than the reference length in the longitudinal direction by an edge of the bottom plane adjacent to the notch fastening part in the right part due to being cut by a second length in the longitudinal direction.

5. The solid state drive of claim 4, wherein the first length and the second length are different from each other.

6. The solid state drive of claim 1, wherein the noise is generated by the plurality of devices coupled to the platform.

7. The solid state drive of claim 1, wherein the noise is generated by a RF antenna connected to the platform.

8. The solid state drive of claim 1, wherein a width of the bottom plane in a transverse direction perpendicular to the longitudinal direction is less than a preset reference transverse width.

9. A storage device capable of storing data comprising:
a fastening part to which a fastening device connecting the storage device and a platform outside the storage device is fastened;
a plurality of devices coupled to the platform outside the storage device;
a connection part electrically connected to the platform; and
a plane forming a cavity between the platform and the plane when the connection part is electrically connected to the platform,
wherein at least one of a length in a longitudinal direction of a left part of the plane positioned to a left of the fastening part and a length in the longitudinal direction of a right part of the plane positioned to a right of the fastening part is less than a preset reference length in the longitudinal direction,
wherein a resonance frequency, which is determined by the length in the longitudinal direction of the left part and the length in the longitudinal direction of the right part, of the cavity formed between the plane and the top plane of the platform is in a preset target resonance frequency band, wherein the preset target resonance frequency band in which resonance occurs in the cavity and a preset noise frequency band generated by noise in the platform do not overlap, and wherein electromagnetic interference from the noise in the platform is avoided in the plurality of devices coupled to the platform outside the storage device.

10. The storage device of claim 9, wherein the longitudinal direction is a direction from the fastening part to the connection part.

11. The storage device of claim 9, wherein the length in the longitudinal direction of the left part of the plane is less than the reference length in the longitudinal direction by an edge of the plane adjacent to the fastening part in the left part due to being cut by a first length in the longitudinal direction, and wherein the length in the longitudinal direction of a right part of the plane less than the reference length in the longitudinal direction by an edge of the plane adjacent to the fastening part in the right part due to being cut by a second length in the longitudinal direction.

12. The storage device of claim 9, wherein the noise is generated by the plurality of devices coupled to the platform.

13. The storage device of claim 9, wherein the noise is generated by a RF antenna connected to the platform.

14. The storage device of claim 9, wherein a width of the plane in a transverse direction perpendicular to the longitudinal direction is less than a preset reference transverse width.

* * * * *